US012789669B2

(12) United States Patent
Petisme et al.

(10) Patent No.: US 12,789,669 B2
(45) Date of Patent: Nov. 10, 2026

(54) METHOD AND SYSTEM FOR ELECTRICAL ENERGY STORAGE SWAPPING

(71) Applicant: VOLVO TRUCK CORPORATION, Gothenburg (SE)

(72) Inventors: Martin Petisme, Gothenburg (SE); Niladri Roy Chowdhury, Hisings Backa (SE); Masood Tamadondar, Mölndal (SE); Carl-Robert Florén, Gothenburg (SE); Haithem Hamdi, Fernana (TN)

(73) Assignee: VOLVO TRUCK CORPORATION, Gothenburg (SE)

( * ) Notice: Subject to any disclaimer, the term of this patent is extended or adjusted under 35 U.S.C. 154(b) by 78 days.

(21) Appl. No.: 18/631,422

(22) Filed: Apr. 10, 2024

(65) Prior Publication Data

US 2024/0346196 A1 Oct. 17, 2024

(30) Foreign Application Priority Data

Apr. 17, 2023 (EP) .................................... 23168178

(51) Int. Cl.
*B60L 58/16* (2019.01)
*B60L 53/80* (2019.01)
*B60L 58/13* (2019.01)

(52) U.S. Cl.
CPC ............... *B60L 58/16* (2019.02); *B60L 53/80* (2019.02); *B60L 58/13* (2019.02)

(58) Field of Classification Search
CPC ..... B60L 53/80; B60L 58/16; B60L 58/12–14
See application file for complete search history.

(56) References Cited

U.S. PATENT DOCUMENTS 11,529,887 B2 12/2022 Herring et al.
2011/0258838 A1* 10/2011 McCabe ............... H01M 10/44 29/593

(Continued)

FOREIGN PATENT DOCUMENTS

DE 102014224386 A1 6/2016

OTHER PUBLICATIONS

Extended European Search Report in corresponding European Application No. 23168178.4 dated Oct. 17, 2023 (9 pages).

*Primary Examiner* — Erin D Bishop
*Assistant Examiner* — Joseph Thompson
(74) *Attorney, Agent, or Firm* — Jeffri A. Kaminski; Venable LLP

(57) ABSTRACT

A computer system includes processing circuitry configured to simulate, using electrical multi-battery models, the performance of a propulsion electrical energy storage system of a vehicle based on logged vehicle routes of the vehicle, the electrical energy storage system comprising multiple electrical energy storage packs, predict a lifetime of the electrical energy storage system based on the simulated performance of the propulsion electrical energy storage system and extrapolating forward assuming a worst-case aging rate; if the predicted lifetime exceeds a predetermined lifetime, indicate that an electrical energy storage pack downgrade replacement is required, and reduce a state of charge window of the electrical energy storage system at a rate such that a predetermined minimum state of charge window is not reached before a planned electrical energy storage pack downgrade replacement.

17 Claims, 9 Drawing Sheets

(56) References Cited

U.S. PATENT DOCUMENTS

| | | | | |
|---|---|---|---|---|
| 2013/0221916 | A1 | 8/2013 | Kelty et al. | |
| 2015/0239365 | A1* | 8/2015 | Hyde | B60L 58/26 701/2 |
| 2016/0039295 | A1* | 2/2016 | Madurai-Kumar | B60L 53/64 320/109 |
| 2016/0162849 | A1* | 6/2016 | Matsuyama | B60L 53/80 705/305 |
| 2016/0221465 | A1* | 8/2016 | Kratzer | H02J 7/0013 |
| 2016/0368481 | A1 | 12/2016 | Nuber et al. | |
| 2017/0355276 | A1* | 12/2017 | Chang | B60L 58/12 |
| 2020/0326381 | A1 | 10/2020 | Matsumura et al. | |
| 2021/0188114 | A1* | 6/2021 | Ferguson | H02J 7/005 |
| 2021/0380013 | A1 | 12/2021 | Moszynski et al. | |
| 2022/0402396 | A1 | 12/2022 | Zhang | |
| 2023/0194281 | A1* | 6/2023 | Lane | G06Q 10/20 |
| 2023/0211690 | A1* | 7/2023 | Heo | B60L 53/16 320/109 |
| 2023/0219453 | A1* | 7/2023 | Lerner | B60L 58/16 180/68.5 |

* cited by examiner

METHOD AND SYSTEM FOR ELECTRICAL ENERGY STORAGE SWAPPING

TECHNICAL FIELD

The disclosure relates generally to electrical energy storage devices for vehicles. In particular aspects, the disclosure relates to a method and system for electrical energy storage swapping. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Electric vehicles have recently become more frequently employed in an increasing number of markets, not only for private use, but also for fleets of vehicles for e.g., cargo transportation and public transportation. The high voltage batteries providing propulsion power to the vehicles are at the heart of the vehicles and their performance and lifetimes therefore are critical.

SUMMARY

According to a first aspect of the disclosure, there is provided a computer system comprising processing circuitry configured to: simulate, using electrical multi-battery models, the performance of a propulsion electrical energy storage system of a vehicle based on logged vehicle routes of the vehicle, the electrical energy storage system comprising multiple electrical energy storage packs, predict a lifetime of the electrical energy storage system based on the simulated performance of the propulsion electrical energy storage system and extrapolating forward assuming a worst-case aging rate; if the predicted lifetime exceeds a predetermined lifetime, indicate that an electrical energy storage pack downgrade replacement is required, and reduce a state of charge window of the electrical energy storage system at a rate such that a predetermined minimum state of charge window is not reached before a planned electrical energy storage pack downgrade replacement.

The first aspect of the disclosure may seek to make more efficient use of electrical energy storage devices. A technical benefit may include improved predictability of the lifetime of electrical energy storage devices. Furthermore, a technical benefit may include improved lifetime of electrical energy storage devices without reducing their performance as experienced by a user significantly before replacement.

In some examples, including in at least one preferred example, optionally the processing circuitry further being configured to: access a database of state of health of an inventory of electrical energy storage packs, select a set of replacement candidate electrical energy storage packs based on their state of health compared to the state of health of the electrical energy storage system before replacement, simulate, using the electrical multi-battery models, the performance of a new propulsion electrical energy storage system with one or more downgrade replacement electrical energy storage packs included, verify that the new propulsion electrical energy storage system can fulfill the mission of the vehicle, provide an indication of the configuration of electrical energy storage packs of the new propulsion electrical energy storage system. A technical benefit may include accurate selection of electrical energy storage packs that still ensure that the mission can be fulfilled.

In some examples, including in at least one preferred example, optionally the worst-case aging rate is a predetermined rate based on user input. A technical benefit may include that the worst-case aging rate is set based on accurate knowledge of the missions and vehicle use.

In some examples, optionally, the worst-case aging rate may be specified in a contractual agreement.

In some examples, including in at least one preferred example, optionally the processing circuitry is configured to: receive a signal that a maintenance event is scheduled or is presently performed, and in response to the signal, initiate the simulation, using the multi-battery model of the performance of the propulsion electrical energy storage system. A technical benefit may include automatic initiation of the method to evaluate whether electrical energy storage pack downgrade replacement is required.

In some examples, including in at least one preferred example, optionally if the predicted lifetime is equal to or below a predetermined lifetime, indicate that an electrical energy storage pack upgrade replacement is required. A technical benefit may include that the vehicle can fulfill more missions. Thus, the upgrade provides an electrical energy storage system with sufficient capacity for the vehicle and its missions.

In some examples, including in at least one preferred example, optionally the electrical energy storage system performance is energy- or current through-put. A technical benefit may include that the energy- or current through-put are accurate measures of the performance of the electrical energy storage system.

In some examples, including in at least one preferred example, optionally the reduction rate in state of charge window of the electrical energy storage system is continuously adjusted until the planned electrical energy storage pack downgrade replacement. A technical benefit may include that the performance of the electrical energy storage system is maintained as high as possible for a longer period of time while still minimizing the aging of the electrical energy storage system.

In some examples, including in at least one preferred example, optionally the worst-case aging rate is a predetermined rate based on user input; the reduction rate in state of charge window of the electrical energy storage system is continuously adjusted until the planned electrical energy storage pack downgrade replacement, the electrical energy storage system performance is energy- or current through-put, and the processing circuitry being configured to: access a database of state of health of an inventory of electrical energy storage packs, select a set of replacement candidate electrical energy storage packs based on their state of health compared to the state of health of the electrical energy storage system before replacement, simulate, using the electrical multi-battery models, the performance of a new propulsion electrical energy storage system with one or more downgrade replacement electrical energy storage packs included, verify that the new propulsion electrical energy storage system can fulfill the mission of the vehicle, provide an indication of the configuration of electrical energy storage packs of the new propulsion electrical energy storage system; and if the predicted lifetime is equal to or below a predetermined lifetime, indicate that an electrical energy storage pack upgrade replacement is required.

There is also provided a vehicle comprising the computer system of the first aspect.

According to a second aspect of the disclosure, a computer-implemented method is presented, comprising: simulating, by a processor device of a computer system, using electrical multi-battery models, the performance of a propulsion electrical energy storage system of a vehicle based on logged vehicle routes of the vehicle, the electrical energy storage system comprising multiple electrical energy storage packs, predicting, by the processor device, a lifetime of the electrical energy storage system based on the simulated performance of the propulsion electrical energy storage system and extrapolating forward assuming a worst-case aging rate; if the predicted lifetime exceeds a predetermined lifetime, indicating, by the processor device, that an electrical energy storage pack downgrade replacement is required, and reducing, by the processor device, a state of charge window of the electrical energy storage system at a rate such that a predetermined minimum state of charge window is not reached before a planned electrical energy storage pack downgrade replacement.

The second aspect of the disclosure may seek to make more efficient use of electrical energy storage devices. A technical benefit may include improved predictability of the lifetime of electrical energy storage devices. Furthermore, a technical benefit may include improved lifetime of electrical energy storage devices without reducing their performance as experienced by a user significantly before replacement.

In some examples, including in at least one preferred example, optionally accessing, by the processor device, a database of state of health of an inventory of electrical energy storage packs, selecting, by the processor device, a set of replacement candidate electrical energy storage packs based on their state of health compared to the state of health of the electrical energy storage system before replacement, simulating, by the processor device, using the electrical multi-battery models, the performance of a new propulsion electrical energy storage system with one or more downgrade replacement electrical energy storage packs included, verifying, by the processor device, that the new propulsion electrical energy storage system can fulfill the mission of the vehicle, providing, by the processor device, an indication of the configuration of electrical energy storage packs of the new propulsion electrical energy storage system. A technical benefit may include accurate selection of electrical energy storage packs that still ensure that the mission can be fulfilled.

In some examples, including in at least one preferred example, optionally the worst-case aging rate is a predetermined rate based on user input. A technical benefit may include that the worst-case aging rate is set based on accurate knowledge of the missions and vehicle use.

In some examples, including in at least one preferred example, optionally the method comprises receiving, by the processor device, a signal that a maintenance event is scheduled or is presently performed, and in response to the signal, initiating, by the processor device, the simulation, using the multi-battery model of the performance of the propulsion electrical energy storage system. A technical benefit may include automatic initiation of the method to evaluate whether electrical energy storage pack downgrade replacement is required.

In some examples, including in at least one preferred example, optionally if the predicted lifetime is equal to or below a predetermined lifetime, indicate that an electrical energy storage pack upgrade replacement is required. A technical benefit may include that the vehicle can fulfill more missions. Thus, the upgrade provides an electrical energy storage system with sufficient capacity for the vehicle and its missions.

In some examples, including in at least one preferred example, optionally, wherein the electrical energy storage system performance is energy- or current through-put. A technical benefit may include that the energy- or current through-put are accurate measures of the performance of the electrical energy storage system.

In some examples, including in at least one preferred example, optionally, the reduction rate in state of charge window of the electrical energy storage system is continuously adjusted until the planned electrical energy storage pack downgrade replacement. A technical benefit may include that the performance of the electrical energy storage system is maintained as high as possible for a longer period of time.

In some examples, including in at least one preferred example, optionally, the predetermined lifetime is based on a contracted agreement.

In some examples, including in at least one preferred example, optionally, the worst-case aging rate is a predetermined rate based on user input; the reduction rate in state of charge window of the electrical energy storage system is continuously adjusted until the planned electrical energy storage pack downgrade replacement, the electrical energy storage system performance is energy- or current through-put, and the method comprising: accessing, by the processing circuitry, a database of state of health of an inventory of electrical energy storage packs, selecting, by the processing circuitry, a set of replacement candidate electrical energy storage packs based on their state of health compared to the state of health of the electrical energy storage system before replacement, simulating, by the processing circuitry, using the electrical multi-battery models, the performance of a new propulsion electrical energy storage system with one or more downgrade replacement electrical energy storage packs included, verifying, by the processing circuitry, that the new propulsion electrical energy storage system can fulfill the mission of the vehicle, providing, by the processing circuitry, an indication of the configuration of electrical energy storage packs of the new propulsion electrical energy storage system; and if the predicted lifetime is equal to or below a predetermined lifetime, indicate that an electrical energy storage pack upgrade replacement is required.

There is further provided a computer program product comprising program code for performing, when executed by the processing circuitry, the method of the second aspect.

There is further provided a non-transitory computer-readable storage medium comprising instructions, which when executed by the processing circuitry, cause the processing circuitry to perform the method of the second aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

The detailed description set forth below provides information and examples of the disclosed technology with sufficient detail to enable those skilled in the art to practice the disclosure.

The performance of rechargeable electrical energy storage systems that provide propulsion power to vehicles has a massive impact on the ability of the vehicles to accomplish their missions. Therefore, it may be of interest to maximize the capacity for the electrical energy storage system for each vehicle in a fleet. However, from a sustainability point of view and from a cost perspective, a more efficient use is to distribute and configure the electrical energy storage systems according to the required capacity for each vehicle's mission. However, for this, it would be desirable to have a scheme to predict the lifetime of the electrical energy storages and control its operation so that operator's missions are not unnecessarily obstructed or delayed. Further, it may additionally be of interest to the vehicle owner to ensure that the electrical energy storages can perform according to contractual agreements with the user of the vehicles.

Figure 1A:
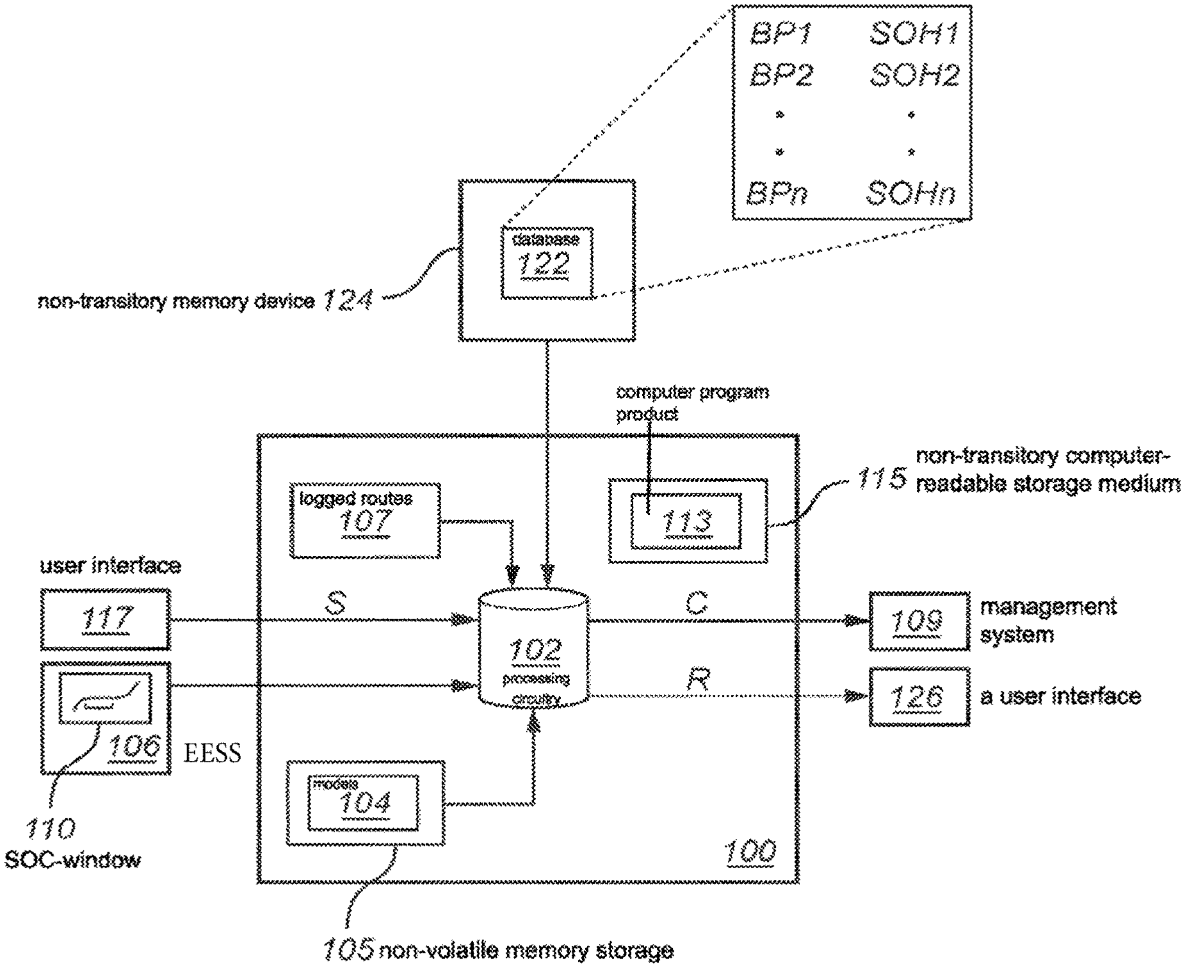
FIG. 1A is an exemplary system diagram according to an example.

FIG. 1A is an exemplary computer system 100 that addresses the above drawbacks of prior art according to an example.

The computer system 100 comprising processing circuitry 102 configured to simulate, using electrical multi-battery models 104, the performance of a propulsion electrical energy storage system 106 of a vehicle based on logged vehicle routes 107 of the vehicle. The electrical energy storage system 106 comprises multiple electrical energy storage packs with cells electrically connected in series and in parallel. The electrical multi-battery models 104 and the logged vehicle routes are stored on a non-volatile memory storage 105 accessible to the processing circuitry 102.

The logged vehicle routes 107 may include data of e.g., road topography including relative altitudes, travelled distance since start being the total mileage of the vehicle, travelled distance for a drive cycle correlated with energy or current throughput of the electrical energy storage system for each time the drive cycle is completed, state of health and state of charge of the electrical energy storage system. Using this data, it is possible to simulate the performance of a propulsion electrical energy storage system 106 using the on-board dynamic models that describe the electrical energy storage system in terms of performance and health.

The processing circuitry 102 is configured to predict a lifetime of the electrical energy storage system 106 based on the simulated performance of the propulsion electrical energy storage system and extrapolating forward assuming a worst-case aging rate. In other words, a present aging status, such as a state of health of the electrical energy storage system 106 is determined using the model 104. From this present state of health, and the assumed worst case aging rate, a minimum predicted lifetime is defined by when the state of health has reached an end-of-life level. Assuming a worst-case aging rate advantageously provides a margin for the predicted lifetime.

If the predicted lifetime exceeds a predetermined lifetime, the processing circuitry 102 indicates that an electrical energy storage pack downgrade replacement is required and reduces a state of charge window 110 of the electrical energy storage system 106 at a rate such that a predetermined minimum state of charge window is not reached before a planned electrical energy storage pack downgrade replacement.

The processing circuitry 102 is connected to a management system 109 that can control operating parameters such as SOC-window 110 of the electrical energy storage system 106. Thus, the processing circuitry 102 transmits a control message C to the management system 109 with instructions to reduce the SOC-window 110.

The processing circuitry 102 further has access to computer program product 113 comprising program code for performing, when executed by the processing circuitry 102, the herein described method. A non-transitory computer-readable storage medium 115 may comprise instructions, which when executed by the processing circuitry, cause the processing circuitry to perform the method.

The worst-case aging rate may be provided as an input via a user interface 117. The user interface may include any input interface to a computer system 100. Data indicating the worst-case aging rate may equally well be stored on a memory storage device accessible to the processing circuitry 102.

Furthermore, the processing circuitry 102 may receive a signal S from the user interface 117 that a maintenance event is scheduled or is presently performed on the vehicle.

The user interface 117 may for example be a computer input interface.

The simulated performance may be the state of health of the electrical energy storage system. State of health may be defined as the loss in capacity relative to a capacity at the beginning of life of the electrical energy storage pack, or the internal resistance increase of the electrical energy storage pack relative the internal resistance at the beginning of life of the electrical energy storage pack. Further, state of health may also be defined by loss in range, loss in peak acceleration capability, efficiency loss, loss in power-ability etc.

In one possible implementation, a state of health aging model is derived from energy throughput and time. Thus, the electrical energy storage system performance is in this case energy- or current through-put.

In other words, it is the rate of change in energy throughput as a function of time. Assuming a worst-case scenario, i.e., a heavy use of the vehicle according to a prespecified use case, the time period for reaching a predetermined lower-level energy throughput can be estimated.

The advantage of assuming a worst-case scenario is preventing optimistic predictions that might not account for change in usage. For example, if the vehicle is lightly used at beginning of life of the electrical energy storage system and is altered to more heavy usage at a later time.

Thus, a worst case aging rate is derived from an assumed heavy use of the vehicle that causes a high aging rate, or the worst aging rate among different aging rates according to a group of use cases of the vehicle.

If the predicted lifetime exceeds the predetermined lifetime, it can be concluded that the electrical energy storage system 106 can be downgraded and that some electrical energy storage packs of the present electrical energy storage system 106 can be more efficiently used in another vehicle.

Before the replacement, and to reduce the aging of the electrical energy storage system 106, the accessible state of charge window is reduced, or narrowed, at a slow rate, barely noticeable to the user. This avoids the user getting annoyed and therefore promotes more user-friendly and gentle prevention of unnecessary aging of the electrical energy storage system 106.

Accordingly, the system disclosed herein provides for more efficient usage of electrical energy storages that promotes sustainability, thus reducing waste, while still providing the user with expected performance, and for more predictable lifetime of electrical energy storage systems.

The predetermined lifetime may be specified in a contract between the vehicle owner and the user.

The processing circuitry 102 has access to a database 122 that is stored on a non-transitory memory device 124 either locally with respect to the computer system or on a remote server. The database 122 includes an inventory of electrical energy storage packs and their state of health, provided as for example state of capacity (SOQ) or state of resistance (SOR).

The processing circuitry 102 may provide messages R to a user interface 126 to indicate that an electrical energy storage pack upgrade replacement or downgrade replacement is required.

Further, the messages R may include an indication of the configuration of electrical energy storage packs of a new propulsion electrical energy storage system.

In one possible implementation, the worst-case aging rate is a predetermined rate based on user input; the reduction rate in state of charge window 110 of the electrical energy storage system 106 is continuously adjusted until the planned electrical energy storage pack downgrade replacement, the electrical energy storage system performance is energy- or current through-put, and the processing circuitry 102 is configured to: access a database 122 of state of health of an inventory of electrical energy storage packs, BP, select a set of replacement candidate electrical energy storage packs based on their state of health compared to the state of health of the electrical energy storage system before replacement, simulate, using the electrical multi-battery models 104, the performance of a new propulsion electrical energy storage system with one or more downgrade replacement electrical energy storage packs included, verify that the new propulsion electrical energy storage system can fulfill the mission of the vehicle, provide an indication of the configuration of electrical energy storage packs of the new propulsion electrical energy storage system; and if the predicted lifetime is equal to or below a predetermined lifetime, indicate that an electrical energy storage pack upgrade replacement is required.

Figure 1B:
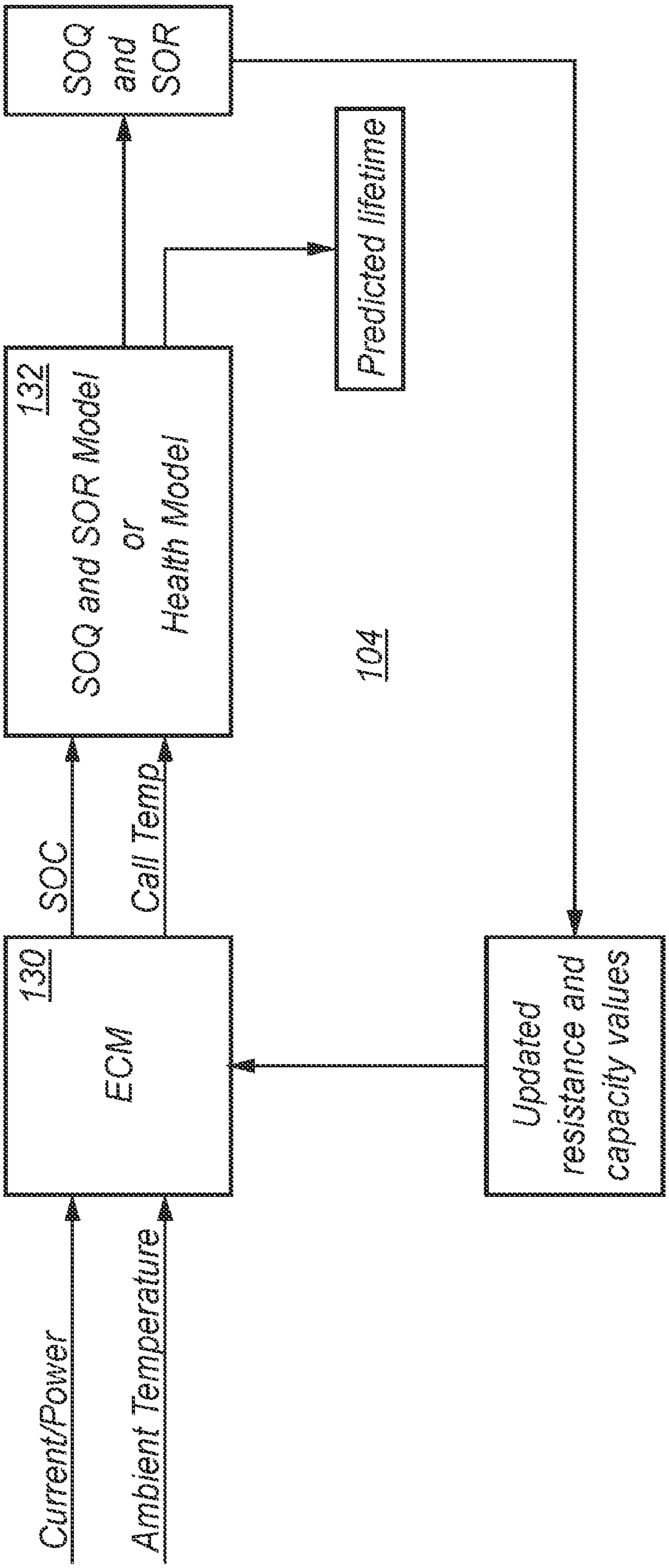
FIG. 1B is a block diagram of a model according to one example.

FIG. 1B is an overview of the model 104. The model 104 includes an equivalent circuit model (ECM) of a battery coupled to a health prediction model 132. The inputs to the ECM 130 are ambient temperature and demanded current/power from the battery pack. The output of the ECM 130 is predicted SOC profile, cell temperature and battery parameters connected to the ECM model such as resistance and capacity of the battery. These are fed to a health model 132 which predicts SOR, SOQ, and the lifetime by extrapolating a simulated performance of the battery forward assuming a worst-case aging rate. The outputs of the health model are in turn used to update the resistance and capacity values in the ECM model 130 for the next iteration of predicting the lifetime. The inputs ambient temperature and demanded current/power are acquired from the logged routes. Further inputs from the logged routes are also envisaged.

Figure 2:
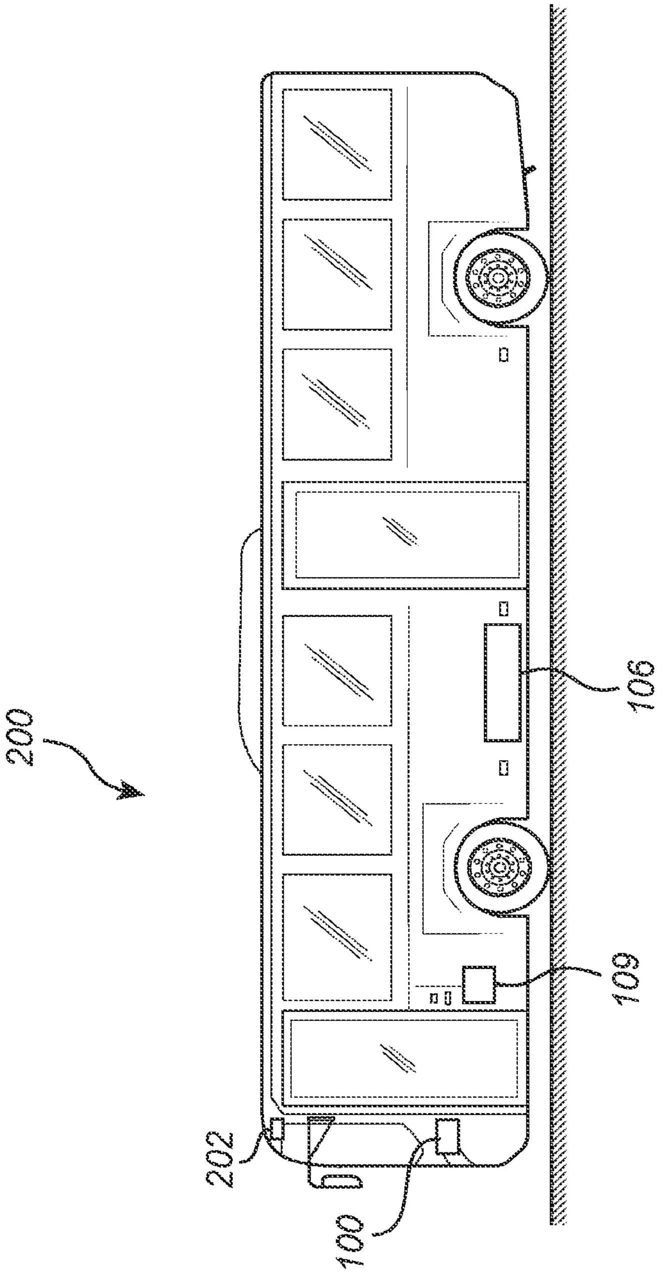
FIG. 2 is a vehicle according to an example.

FIG. 2 illustrates a vehicle in the form of an electrical bus 200 comprising a rechargeable propulsion electrical energy storage system 106 generally comprising a plurality of series and parallel connected electrical energy storage cells. The propulsion electrical energy storage 106 is arranged to provide power to an electrical engine (not shown) arranged for providing propulsion for the electrical bus 200. The electrical bus 200 further comprises an electrical energy storage managing system 109 which is configured to monitor electrical energy storage cell characteristics such as state of charge (SOC), state of health (SOH), state of power (SOP), state of energy (SOE), state of capacity (SOQ), electrical energy storage voltage, state of resistance (SOR) i.e., internal impedance, and optionally temperature of the electrical energy storage cells. The propulsion electrical energy storage system 106 may be a Li-ion electrical energy storage comprising multiple packs with cells electrically connected in series and in parallel.

The vehicle 200 further comprises the computer system 100 described herein, and optionally a wireless communication device 202 that can transmit and receive data from a remote server.

Although the vehicle in FIG. 2 is depicted as a bus, embodiments of the present disclosure may as well be implemented in other types of vehicles, such as in heavy-duty trucks, light-weight trucks, passenger cars, construction equipment, industrial applications, and marine applications including e.g. vessels or ships.

Figure 3:
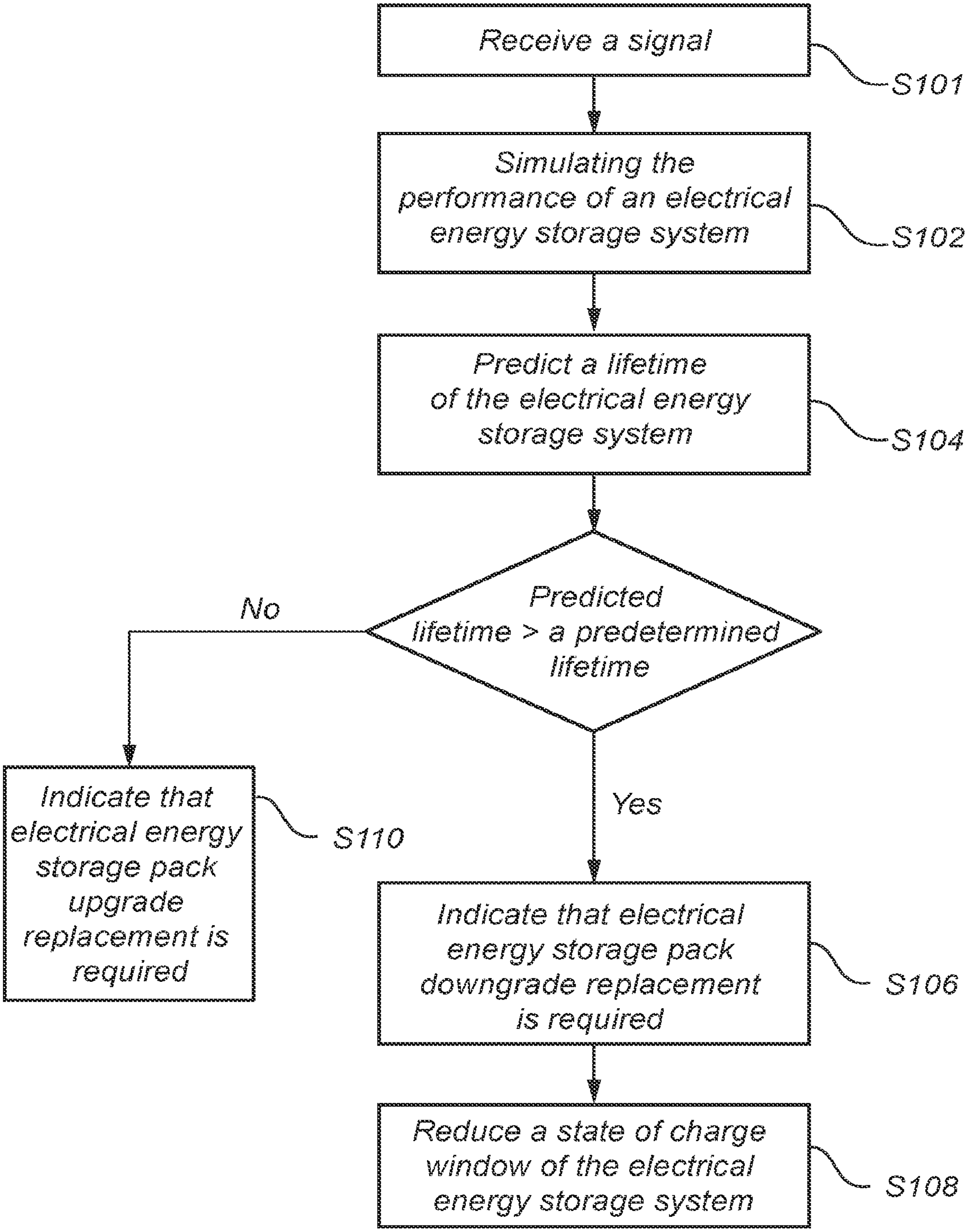
FIG. 3 is a flow chart of an exemplary method according to an example.

FIG. 3 is a flow-chart according to a computer-implemented method to control an electrical energy storage system of a vehicle.

In step S102, simulating, by a processor device 102 of a computer system 100, using electrical multi-battery models 104, the performance of a propulsion electrical energy storage system 106 of a vehicle based on logged vehicle routes of the vehicle, the electrical energy storage system comprising multiple electrical energy storage packs. In some examples, the electrical energy storage system performance is energy- or current through-put of the electrical energy storage system.

In some examples, the step S102 is initiated in response to an optional prior step S101 of receiving, by the processor device 102, a signal that a maintenance event is scheduled or is presently performed.

In step S104, predicting, by the processor device 102, a lifetime of the electrical energy storage system 106 based on the simulated performance of the propulsion electrical energy storage system and extrapolating forward assuming a worst-case aging rate. The worst-case aging rate is a predetermined rate based on user input such as upper boundaries of expected usage of the vehicle or based on the intended drive cycle that causes worst-case aging. For example, the user may specify prior to usage of the vehicle boundary conditions of usage harshness where the harshest usage may be used to determine the worst-case aging rate.

If the predicted lifetime exceeds a predetermined lifetime, indicating, in step S106, by the processor device 102, that an electrical energy storage pack downgrade replacement is required. Thus, if it is determined that the predicted lifetime, even when assuming a worst-case aging rate, exceeds a predetermined lifetime, an electrical energy storage pack downgrade for the vehicle is flagged. Thus, the present capacity and performance of the electrical energy storage system exceeds the requirements for the vehicle and may be better used elsewhere.

In step S108, reducing, by the processor device 102, a state of charge window 110 of the electrical energy storage system 106 at a rate such that a predetermined minimum state of charge window is not reached before a planned electrical energy storage pack downgrade replacement.

Preferably, the reduction rate in state of charge window 110 of the electrical energy storage system is continuously adjusted until the planned electrical energy storage pack downgrade replacement. That is, the adjustment may be performed at a constant rate, or the slowest possible rate, until the downgrade replacement so that the user is not disturbed by the reduction but can proceed with the vehicle missions as planned. For example, the amount that the state of charge window can be continuously shrunk, i.e., the difference between the present state of charge window and the minimum state of charge window may be divided by the time period from the simulation to the planned electrical energy storage pack downgrade replacement to calculate the reduction rate. The rate may be for example SOC-reduction per day or per hour.

The minimum state of charge window is determined based on the intended usage and logged routes of the vehicle. In other words, the minimum amount of energy required to operate the vehicle according to its missions may be predetermined or stored, wherein the minimum state of charge window is such that the minimum amount of energy is extractable from the electrical energy storage system. Stated otherwise, knowledge of how much energy is required to fulfill the driving of the mission, and the starting state-of-charge of the system, as well as expected losses in the system, it is possible to estimate the minimum state of charge.

However, if the predicted lifetime is equal to or below a predetermined lifetime, indicate, by the processor device in step S110, that an electrical energy storage pack upgrade replacement is required. That is, if the predicted lifetime turns out to not fulfill the requirements related to vehicle missions or predetermined contractual agreements on performance over a given lifetime, one or more electrical energy storage packs may need to be replaced with better performing packs.

When it comes to electrical energy storage pack downgrade replacement, the best performing, or equally least aged electrical energy storage packs, may be selected for replacement. Thus, the processor device 102 may evaluate the state of health of the electrical energy storage packs and as an initial selection, the least aged electrical energy storage packs are selected for replacement. The number of electrical energy storage packs that are replaced depends on the degree of downgrade that is required and the present state of health of the electrical energy storage packs.

It is envisaged that the method is performed by processor circuitry on a server, that is, as a cloud-based service.

Furthermore, the method may be repeated at regular intervals, such as once a week, once a month, once a year, or similar, or based on triggers from a central service, for example before a workshop visit.

Figure 4:
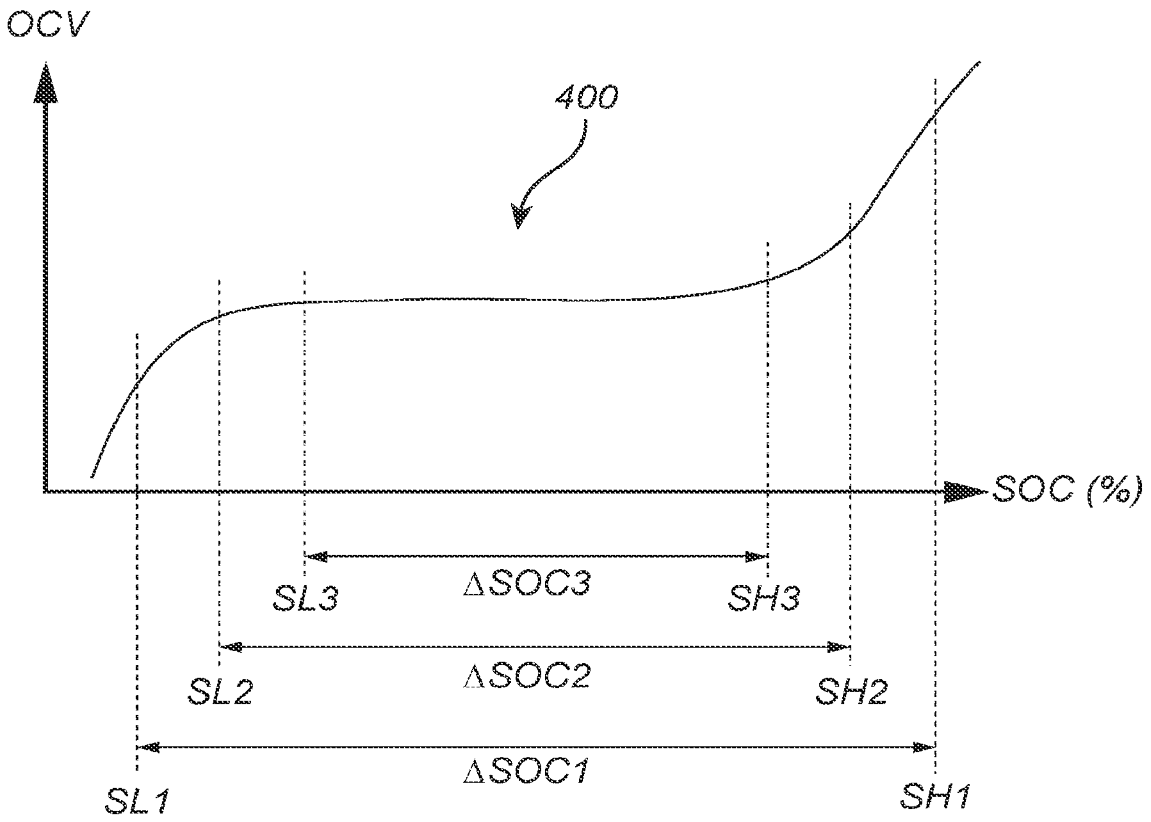
FIG. 4 is an example OCV-SOC curve according to an example.

FIG. 4 shows an example open circuit voltage (OCV) vs. state of charge (SOC) curve 400. The state of charge is often given in terms of percentage of a fully charged electrical energy storage system or pack. The state of charge window is the amount of the full state of charge range 0-100% that is utilized. It is generally desirable to avoid high state of charge levels and very low state of charge levels, e.g., a depleted electrical energy storage system/pack. An example state of charge window may be 10% SOC to 90% SOC.

In FIG. 4, three example state of charge windows ΔSOC1, ΔSOC2, and ΔSOC3 are indicated. Each state of charge window ΔSOC1, ΔSOC2, and ΔSOC3 is delimited by a respective relatively lower level SL1, SL2, SL3, and a respective relatively higher level, SH1, SH2, SH3. When the state of charge window is reduced, the difference between the relatively higher level and the relatively lower level is reduced. For example, the state of charge windows ΔSOC1, ΔSOC2, and ΔSOC3 are of different size, where ΔSOC1 is the largest and ΔSOC3 is the smallest. The reduction in state of charge window is performed by moving the relatively lower limit SL1 towards SL2 and SL3, and/or by moving the relatively higher limit SH1 towards SH2 and SH3. The reduction rate may be the difference between the initial state of charge window ΔSOC1 and a predetermined minimum state of charge window ΔSOC3 divided by the time in e.g., days, to a planned downgrade replacement.

Figure 5:
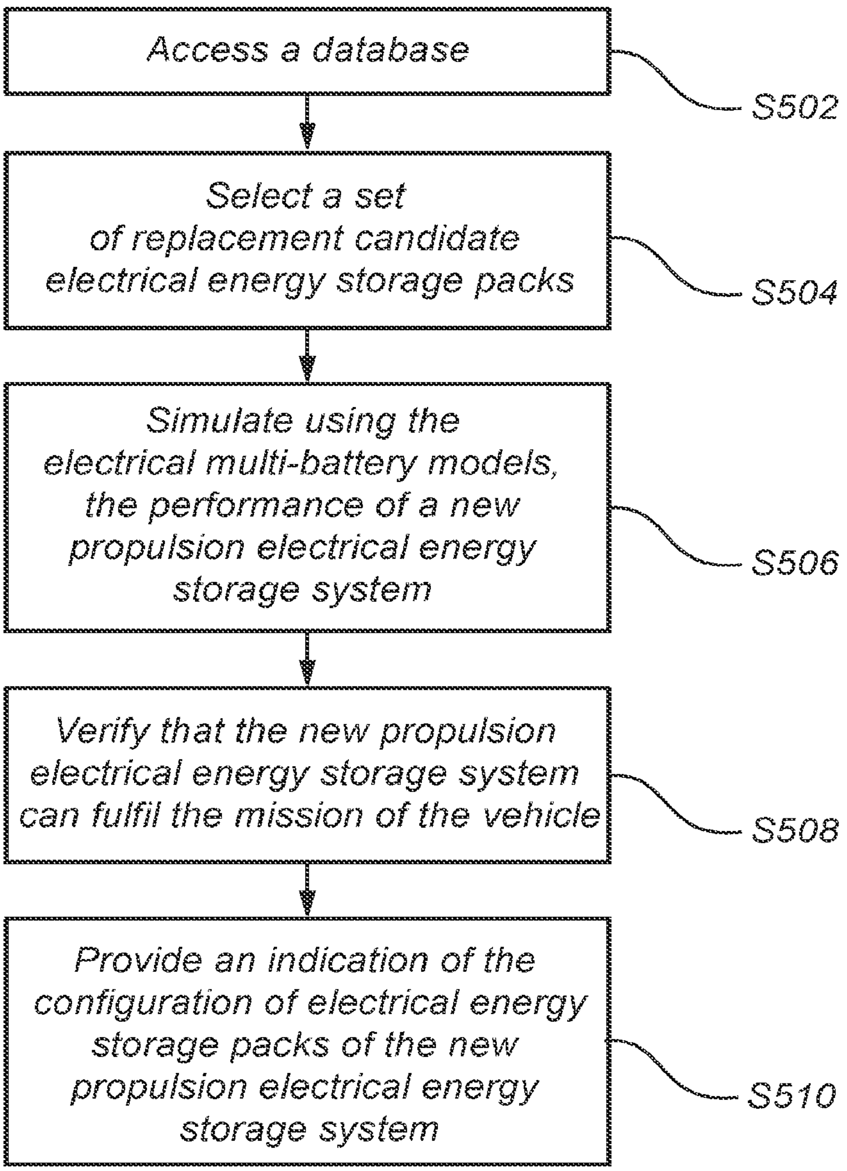
FIG. 5 is a flow chart of an exemplary method according to an example.

FIG. 5 is a flow-chart with further steps according to example methods.

In step S502, accessing, by the processor device, a database of state of health of an inventory of electrical energy storage packs. Thus, in case an electrical energy storage pack replacement is required, the processor device 102 accesses the database 122.

Figure 6:
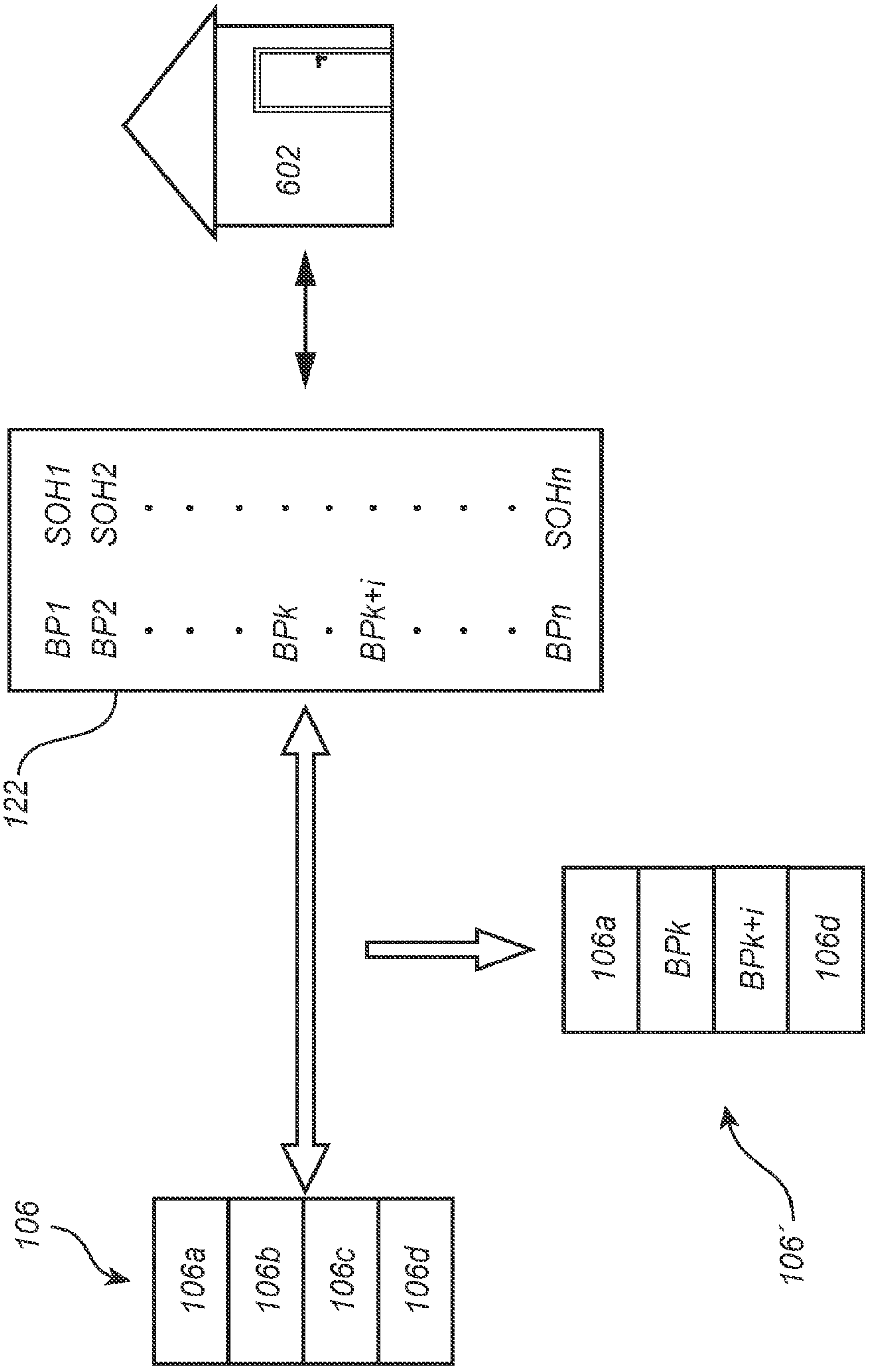
FIG. 6 is box diagram that exemplifies an electrical energy storage replacement according to an example.

FIG. 6 is a box-diagram of an electrical energy storage system 106 comprising a set of electrical energy storage packs 106*a-d*, here only exemplified with four packs 106*a-d*, in reality more than four packs are typically included. Furthermore, a database 122 comprises an inventory of electrical energy storage packs BP1-n and their state of health SOH1-n, stored in a warehouse 602 or placed in other vehicles. In this example, the predicted lifetime of the electrical energy storage system 106 exceeds the predetermined lifetime. The state of health of the electrical energy storage system 106 is determined.

In step S504, selecting, by the processor device 102, a set of replacement candidate electrical energy storage packs based on their state of health compared to the state of health of the electrical energy storage system before replacement. For example, the state of health of the packs 106*a-d* may be determined and the one or more with state of health that indicates relatively low aging may be considered for replacement with a respective number of candidate electrical energy storage packs BPk from the inventory 602 with state of health that indicates relatively higher aging than the one or more packs of the electrical energy storage system 106 with state of health indicating relatively low aging. For example, the electrical energy storage packs 106*b-c* may be initially selected for replacement with the electrical energy storage packs BPk and BPk+i. The selection is made so that the electrical energy storage system with minimized aging burden and maximized performance is obtained, given the available packs to choose from. A big disparity between the battery packs' state of health may result in a poor performance of the entire system and should be avoided.

In step S506, simulating, by the processor device 102, using the electrical multi-battery models 104, the performance of a new propulsion electrical energy storage system 106' with one or more downgrade replacement electrical energy storage packs BPk, BPk+i included.

In step S508, verifying, by the processor device 102, that the new propulsion electrical energy storage 106' system can fulfill the mission of the vehicle. A set of different combinations of replacement electrical energy storage packs BPk and prior electrical energy storage packs 106*a-d* are simulated until a combination is found that can be positively verified.

In step S510, providing, by the processor device 102, an indication of the configuration of electrical energy storage packs of the new propulsion electrical energy storage system.

Advantageously, the needed warehouse 602 size may be reduced because the electrical energy storage packs that are taken out from vehicles and replacement by downgrade packs can be used to upgrade other vehicles.

In possible implementation, the worst-case aging rate is a predetermined rate based on user input; the reduction rate in state of charge window of the electrical energy storage system is continuously adjusted until the planned electrical energy storage pack downgrade replacement, the electrical energy storage system performance is energy- or current through-put, and the method comprising: accessing, by the processing circuitry, a database of state of health of an inventory of electrical energy storage packs, selecting, by the processing circuitry, a set of replacement candidate electrical energy storage packs based on their state of health compared to the state of health of the electrical energy storage system before replacement, simulating, by the processing circuitry, using the electrical multi-battery models, the performance of a new propulsion electrical energy storage system with one or more downgrade replacement electrical energy storage packs included, verifying, by the processing circuitry, that the new propulsion electrical energy storage system can fulfill the mission of the vehicle, providing, by the processing circuitry, an indication of the configuration of electrical energy storage packs of the new propulsion electrical energy storage system; and if the predicted lifetime is equal to or below a predetermined lifetime, indicate that an electrical energy storage pack upgrade replacement is required.

Figure 7:
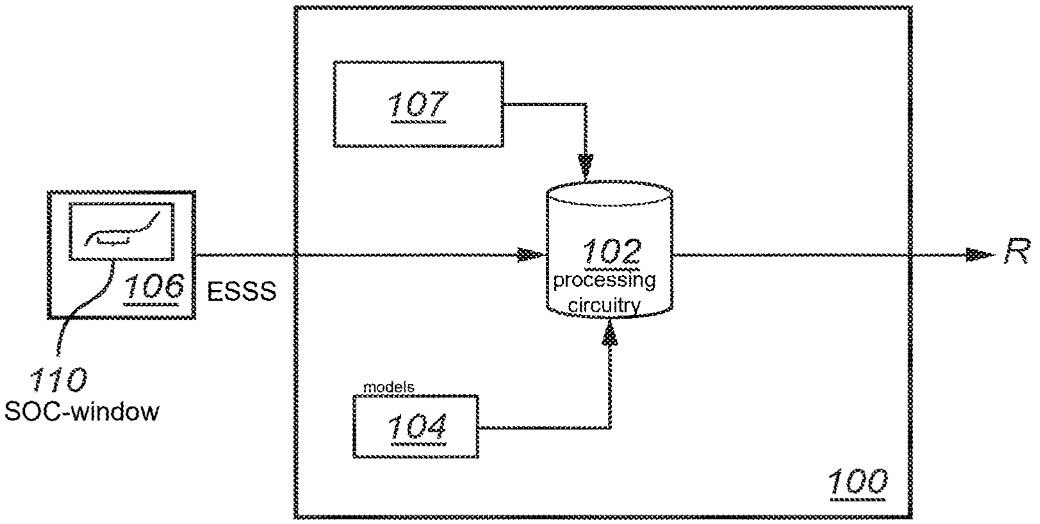
FIG. 7 is a schematic diagram of an exemplary computer system for implementing examples disclosed herein, according to an example.
Figure 8:
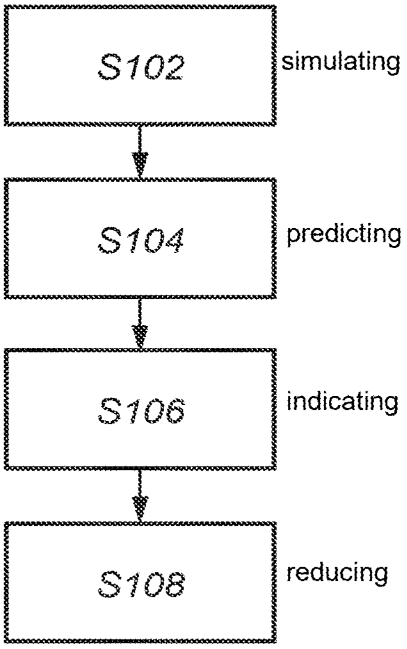
Figure 9:
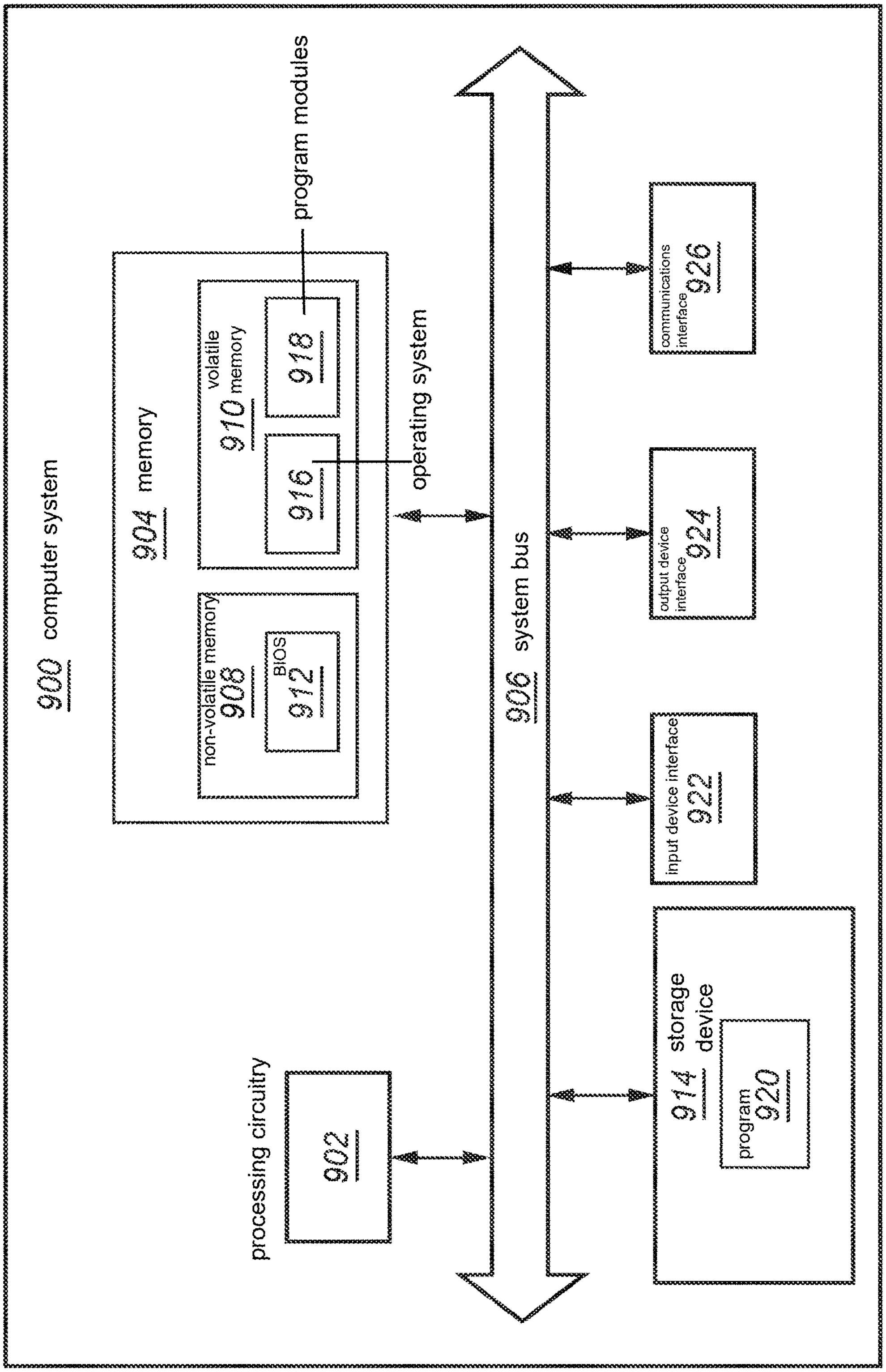

FIG. 7 is a schematic diagram of a computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN, an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include processing circuitry 902 (e.g., processing circuitry including one or more processor devices or control units), a memory 904, and a system bus 906. The computer system 900 may include at least one computing device having the processing circuitry 902. The system bus 906 provides an interface for system components including, but not limited to, the memory 904 and the processing circuitry 902. The processing circuitry 902 may include any number of hardware components for conducting data or signal processing or for executing computer code stored in memory 904. The processing circuitry 902 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 902 may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to: simulate, using electrical multi-battery models, the performance of a propulsion electrical energy storage system of a vehicle based on logged vehicle routes of the vehicle, the electrical energy storage system comprising multiple electrical energy storage packs, predict a lifetime of the electrical energy storage system based on the simulated performance of the propulsion electrical energy storage system and extrapolating forward assuming a worst-case aging rate; if the predicted lifetime exceeds a predetermined lifetime, indicate that an electrical energy storage pack downgrade replacement is required, and reduce a state of charge window of the electrical energy storage system at a rate such that a predetermined minimum state of charge window is not reached before a planned electrical energy storage pack downgrade replacement.

Example 2: The computer system of example 1, the processing circuitry further being configured to: access a database of state of health of an inventory of electrical energy storage packs, select a set of replacement candidate electrical energy storage packs based on their state of health compared to the state of health of the electrical energy storage system before replacement, simulate, using the electrical multi-battery models, the performance of a new propulsion electrical energy storage system with one or more downgrade replacement electrical energy storage packs included, verify that the new propulsion electrical energy storage system can fulfill the mission of the vehicle, provide an indication of the configuration of electrical energy storage packs of the new propulsion electrical energy storage system.

Example 3: The computer system of any of examples 1-2, wherein the worst-case aging rate is a predetermined rate based on user input.

Example 4: The computer system of any of examples 1-3, wherein the processing circuitry is configured to: receive a signal that a maintenance event is scheduled or is presently performed, and in response to the signal, initiate the simulation, using the multi-battery model of the performance of the propulsion electrical energy storage system.

Example 5: The computer system of any of examples 1-4, wherein if the predicted lifetime is equal to or below a predetermined lifetime, indicate that an electrical energy storage pack upgrade replacement is required.

Example 6: The computer system of any of examples 1-5, wherein the electrical energy storage system performance is energy- or current through-put.

Example 7: The computer system of any of examples 1-6, wherein the reduction rate in state of charge window of the electrical energy storage system is continuously adjusted until the planned electrical energy storage pack downgrade replacement.

Example 8: The computer system of example 1, wherein, the worst-case aging rate is a predetermined rate based on user input; the reduction rate in state of charge window of the electrical energy storage system is continuously adjusted until the planned electrical energy storage pack downgrade replacement, the electrical energy storage system performance is energy- or current through-put, and the processing circuitry being configured to: access a database of state of health of an inventory of electrical energy storage packs, select a set of replacement candidate electrical energy storage packs based on their state of health compared to the state of health of the electrical energy storage system before replacement, simulate, using the electrical multi-battery models, the performance of a new propulsion electrical energy storage system with one or more downgrade replacement electrical energy storage packs included, verify that the new propulsion electrical energy storage system can fulfill the mission of the vehicle, provide an indication of the configuration of electrical energy storage packs of the new propulsion electrical energy storage system; and if the predicted lifetime is equal to or below a predetermined lifetime, indicate that an electrical energy storage pack upgrade replacement is required.

Example 9: A vehicle comprising the computer system of any of examples 1-8.

Example 10: A computer-implemented method, comprising: simulating, by a processor device of a computer system, using electrical multi-battery models, the performance of a propulsion electrical energy storage system of a vehicle based on logged vehicle routes of the vehicle, the electrical energy storage system comprising multiple electrical energy storage packs, predicting, by the processor device, a lifetime of the electrical energy storage system based on the simulated performance of the propulsion electrical energy storage system and extrapolating forward assuming a worst-case aging rate; if the predicted lifetime exceeds a predetermined lifetime, indicating, by the processor device, that an electrical energy storage pack downgrade replacement is required, and reducing, by the processor device, a state of charge window of the electrical energy storage system at a rate such that a predetermined minimum state of charge window is not reached before a planned electrical energy storage pack downgrade replacement.

Example 11: The method of example 10, further comprising: accessing, by the processor device, a database of state of health of an inventory of electrical energy storage packs, selecting, by the processor device, a set of replacement candidate electrical energy storage packs based on their state of health compared to the state of health of the electrical energy storage system before replacement, simulating, by the processor device, using the electrical multi-battery models, the performance of a new propulsion electrical energy storage system with one or more downgrade replacement electrical energy storage packs included, verifying, by the processor device, that the new propulsion electrical energy storage system can fulfill the mission of the vehicle, providing, by the processor device, an indication of the configuration of electrical energy storage packs of the new propulsion electrical energy storage system.

Example 12: The method of any of examples 10-11, wherein the worst-case aging rate is a predetermined rate based on user input.

Example 13: The method of any of examples 10-12, comprising: receiving, by the processor device, a signal that a maintenance event is scheduled or is presently performed, and in response to the signal, initiating, by the processor device, the simulation, using the multi-battery model of the performance of the propulsion electrical energy storage system.

Example 14: The method of any of examples 10-13, wherein if the predicted lifetime is equal to or below a predetermined lifetime, indicate that an electrical energy storage pack upgrade replacement is required.

Example 15: The method of example 10-14, wherein the electrical energy storage system performance is energy- or current through-put.

Example 16: The method of any of examples 9-15, wherein the reduction rate in state of charge window of the electrical energy storage system is continuously adjusted until the planned electrical energy storage pack downgrade replacement.

Example 17: The method of any of examples 9-16, the predetermined lifetime is based on a contracted agreement.

Example 18: The method of any of examples 10-17, the worst-case aging rate is a predetermined rate based on user input; the reduction rate in state of charge window of the electrical energy storage system is continuously adjusted until the planned electrical energy storage pack downgrade replacement, the electrical energy storage system performance is energy- or current through-put, and the method comprising: accessing, by the processing circuitry, a database of state of health of an inventory of electrical energy storage packs, selecting, by the processing circuitry, a set of replacement candidate electrical energy storage packs based on their state of health compared to the state of health of the electrical energy storage system before replacement, simulating, by the processing circuitry, using the electrical multi-battery models, the performance of a new propulsion electrical energy storage system with one or more downgrade replacement electrical energy storage packs included, verifying, by the processing circuitry, that the new propulsion electrical energy storage system can fulfill the mission of the vehicle, providing, by the processing circuitry, an indication of the configuration of electrical energy storage packs of the new propulsion electrical energy storage system; and if the predicted lifetime is equal to or below a predetermined lifetime, indicate that an electrical energy storage pack upgrade replacement is required.

Example 19: A computer program product comprising program code for performing, when executed by the processing circuitry, the method of any of examples 9-18.

Example 20: A non-transitory computer-readable storage medium comprising instructions, which when executed by the processing circuitry, cause the processing circuitry to perform the method of any of examples 9-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

simulate, using electrical multi-battery models, the performance of a propulsion electrical energy storage system of a vehicle based on logged vehicle routes of the vehicle, the electrical energy storage system comprising multiple electrical energy storage packs, predict a lifetime of the electrical energy storage system based on the simulated performance of the propulsion electrical energy storage system and extrapolating the simulated performance forward assuming a worst-case aging rate;

when the predicted lifetime exceeds a predetermined lifetime, indicate that an electrical energy storage pack downgrade replacement is required, and reduce a state of charge window of the electrical energy storage system at a rate such that a predetermined minimum state of charge window is not reached before a planned electrical energy storage pack downgrade replacement.

2. The computer system of claim 1, the processing circuitry further being configured to:

access a database of states of health of an inventory of replacement electrical energy storage packs, select a set of replacement candidate electrical energy storage packs from the inventory based on their states of health compared to the states of health of the electrical energy storage system before replacement, simulate, using the electrical multi-battery models, the performance of a new propulsion electrical energy storage system that includes one or more of the electrical energy storage packs and one or more downgrade replacement electrical energy storage packs from the inventory, verify that the new propulsion electrical energy storage can fulfill a mission of the vehicle, provide an indication of the configuration of electrical energy storage packs of the new propulsion electrical energy storage system.

3. The computer system of claim 1, wherein the worst-case aging rate is a predetermined rate based on user input.

4. The computer system of claim 1, wherein if the predicted lifetime is equal to or below the predetermined lifetime, indicate that an electrical energy storage pack upgrade replacement is required.

5. The computer system of claim 1, wherein the electrical energy storage system performance is one of energy- or current through-put.

6. The computer system of claim 1, wherein the reduction rate in state of charge window of the electrical energy storage system is continuously adjusted until the planned electrical energy storage pack downgrade replacement.

7. The computer system of claim 1, wherein, the worst-case aging rate is a predetermined rate based on user input;

the reduction rate in state of charge window of the electrical energy storage system is continuously adjusted until the planned electrical energy storage pack downgrade replacement, the electrical energy storage system performance is energy- or current through-put, and the processing circuitry is configured to:

access a database of states of health of an inventory of replacement electrical energy storage packs, select a set of replacement candidate electrical energy storage packs from the inventory based on their states of health compared to the states of health of the electrical energy storage system before replacement, simulate, using the electrical multi-battery models, the performance of a new propulsion electrical energy storage system with one or more downgrade replacement electrical energy storage packs included, verify that the new propulsion electrical energy storage system can fulfill a mission of the vehicle, provide an indication of the configuration of electrical energy storage packs of the new propulsion electrical energy storage system; and if the predicted lifetime is equal to or below the predetermined lifetime, indicate that an electrical energy storage pack upgrade replacement is required.

8. A vehicle comprising the computer system of claim 1.

9. A computer-implemented method, comprising:

simulating, by a processor device of a computer system, using electrical multi-battery models, the performance of a propulsion electrical energy storage system of a vehicle based on logged vehicle routes of the vehicle, the electrical energy storage system comprising multiple electrical energy storage packs, predicting, by the processor device, a lifetime of the electrical energy storage system based on the simulated performance of the propulsion electrical energy storage system and extrapolating the simulated performance forward assuming a worst-case aging rate;

when the predicted lifetime exceeds a predetermined lifetime, indicating, by the processor device, that an electrical energy storage pack downgrade replacement is required, and reducing, by the processor device, a state of charge window of the electrical energy storage system at a rate such that a predetermined minimum state of charge window is not reached before a planned electrical energy storage pack downgrade replacement.

10. The method of claim 9, further comprising:

accessing, by the processor device, a database of states of health of an inventory of replacement electrical energy storage packs, selecting, by the processor device, a set of replacement candidate electrical energy storage packs from the inventory based on their states of health compared to the states of health of the electrical energy storage system before replacement, simulating, by the processor device, using the electrical multi-battery models, the performance of a new propulsion electrical energy storage system that includes one or more of the electrical energy storage packs and one or more downgrade replacement electrical energy storage packs from the inventory, verifying, by the processor device, that the new propulsion electrical energy storage system can fulfill a mission of the vehicle, providing, by the processor device, an indication of the configuration of electrical energy storage packs of the new propulsion electrical energy storage system.

11. The method of claim 9, wherein the worst-case aging rate is a predetermined rate based on user input.

12. The method of claim 9, wherein if the predicted lifetime is equal to or below the predetermined lifetime, indicate that an electrical energy storage pack upgrade replacement is required.

13. The method of claim 9, wherein the electrical energy storage system performance is energy- or current through-put.

14. The method of claim 9, wherein the reduction rate in state of charge window of the electrical energy storage system is continuously adjusted until the planned electrical energy storage pack downgrade replacement.

15. The method of claim 9, wherein the predetermined lifetime is based on a contracted agreement.

16. The method of claim 9, wherein, the worst-case aging rate is a predetermined rate based on user input;

the reduction rate in state of charge window of the electrical energy storage system is continuously adjusted until the planned electrical energy storage pack downgrade replacement, the electrical energy storage system performance is energy- or current through-put, and the method further comprising:

accessing, by the processing circuitry, a database of states of health of an inventory of replacement electrical energy storage packs, selecting, by the processing circuitry, a set of replacement candidate electrical energy storage packs from the inventory based on their states of health compared to the states of health of the electrical energy storage system before replacement, simulating, by the processing circuitry, using the electrical multi-battery models, the performance of a new propulsion electrical energy storage system with one or more downgrade replacement electrical energy storage packs included, verifying, by the processing circuitry, that the new propulsion electrical energy storage system can fulfill a mission of the vehicle, providing, by the processing circuitry, an indication of the configuration of electrical energy storage packs of the new propulsion electrical energy storage system; and if the predicted lifetime is equal to or below the predetermined lifetime, indicate that an electrical energy storage pack upgrade replacement is required.

17. A non-transitory computer-readable storage medium comprising instructions, which when executed by the processing circuitry, cause the processing circuitry to perform the method of claim 9.

* * * * *